United States Patent

Kornrumpf et al.

[15] 3,697,717
[45] Oct. 10, 1972

[54] INDUCTION COOKING APPLIANCE WITH MULTICYLINDER POWER CIRCUITS

[72] Inventors: William P. Kornrumpf; John D. Harnden, Jr., both of Schenectady, N.Y.

[73] Assignee: General Electric Company

[22] Filed: Nov. 19, 1971

[21] Appl. No.: 200,528

[52] U.S. Cl. ............219/10.49, 219/10.77, 321/27
[51] Int. Cl. ...............................................H05b 5/04
[58] Field of Search..219/10.49, 10.75, 10.77, 10.79; 321/27

[56] References Cited

UNITED STATES PATENTS

| 3,573,602 | 4/1971 | Jensen | 321/27 |
| 3,466,528 | 9/1969 | Adams | 219/10.75 X |
| 3,506,907 | 4/1970 | Porterfield et al. | 219/10.77 X |
| 3,256,417 | 6/1966 | Merrett | 219/10.79 |

Primary Examiner—J. V. Truhe
Assistant Examiner—B. A. Reynolds
Attorney—John F. Ahern et al.

[57] ABSTRACT

In a smooth-top cooking appliance for inductively heating cooking utensils, the individual outputs of a plurality of lower power rated solid state inverters are coupled by a transformer into a common secondary winding that supplies ultrasonic frequency power to the induction heating coil. The output power of the multicylinder inverter is controlled to obtain a wide range of heating levels. One embodiment is used to synthesize a continuous sinusoidal output waveform.

11 Claims, 7 Drawing Figures

PATENTED OCT 10 1972  3,697,717
SHEET 1 OF 3
Fig.1
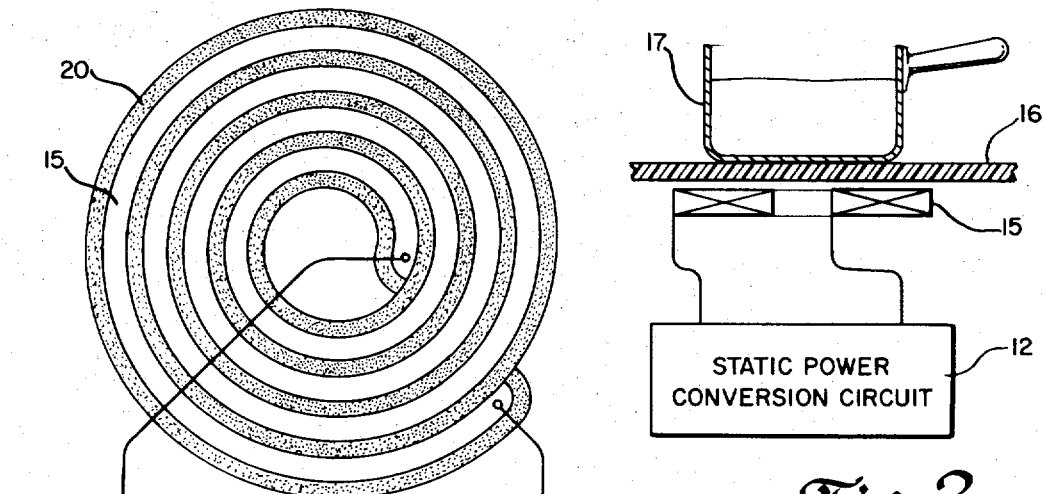
Fig.2
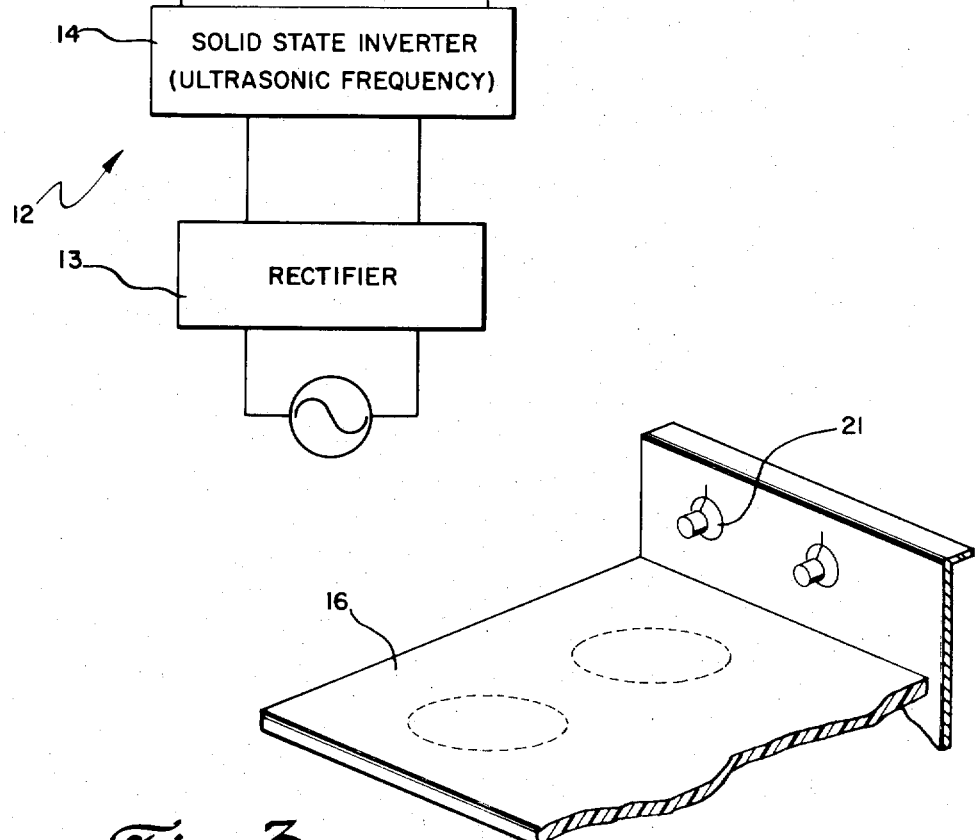
Fig.3

INDUCTION COOKING APPLIANCE WITH MULTICYLINDER POWER CIRCUITS

CROSS-REFERENCE TO RELATED APPLICATIONS

Solid state induction cooking appliances using other inverter power circuits are described and claimed in the following concurrently filed applications both assigned to the assignee of the present invention: Ser. No. 200,526 by David L. Bowers, Donald S. Heidtmann, and John D. Harnden, Jr.; and Ser. No. 200,424 by John D. Harnden, Jr. and William P. Kornrumpf.

BACKGROUND OF THE INVENTION

This invention relates to cooking appliances based on induction heating, and more particularly to solid state induction cooking appliances with multicylinder inverter power circuits.

Although known in principle for a number of years, the application of induction heating to the cooking of food was not potentially competitive with the common gas range and electric range based on resistance heating until the development of solid state, ultrasonic frequency cooking equipment. These cool top appliances, as they are commonly known, have made possible a significant reduction in cost and size and overcome other deficiencies of the prior art attempts. The power unit of these new appliances is a static power conversion circuit typically formed by a rectifier and a solid state inverter that generates an ultrasonic voltage wave for driving the induction heating coil. The inverters set forth in the above-identified applications in general are relatively simple one-device and two-device inverters that minimize the number of required circuit components and power semiconductors, and some use only one gating circuit. The cost of large area, high voltage power semiconductors, however, may not be favorable as compared to a larger number of small area devices of more modest specifications. Also the achievement of wide range output power control for cooking tasks from rapid boiling to warming easily burned foods is not easily solved in conventional power converter systems. For these reasons, multicylinder inverter power circuit approaches may be desirable. The second cross-referenced case describes a multicylinder power circuit, but this is a special type using the one-device resonant inverters there disclosed.

SUMMARY OF THE INVENTION

The solid state cooking appliance to which the invention is applicable comprises an induction heating coil that is mounted adjacent a substantially unbroken non-metallic utensil support and produces an alternating magnetic field for coupling power to a cooking utensil. A static power conversion circuit includes a source of unidirectional voltage such as a rectifier or a battery, and a solid state inverter for generating an ultrasonic frequency wave that drives the induction heating coil. For reasons of economy and improved performance, a multicylinder inverter power circuit is used. The multicylinder inverter comprises a plurality of unit inverter power circuits, preferably identical to one another, that are operated selectively to produce individual outputs which are coupled in sequence to the induction heating coil. The individual outputs as herein taught are combined by means of a high frequency coupling transformer having a primary winding for each unit inverter power and a common secondary winding that applies the composite ultrasonic frequency wave to the induction heating coil. Thus the power and frequency requirement of each unit inverter circuit is a fraction of the total.

A wide range of output power to produce different heating levels is readily obtained by changing the repetition rate or sequencing of the unit inverter circuits. In another embodiment a pair of unit inverter circuits generate out-of-phase half sinusoidal pulses that are combined by the high frequency coupling transformer to produce a continuous sinusoidal output waveform. When the unit inverters are the type utilizing a commutating capacitor, a common commutating capacitor can be connected in the transformer secondary circuit.

BRIEF DESCRIPTION OF THE DRAWINGS

FIG. 1 is a block diagram of a static power conversion circuit for supplying ultrasonic frequency power to a flat spiral induction heating coil, shown in plan view, in a solid state induction cooking appliance;

FIG. 2 is a diagrammatic cross-sectional view showing the relation of the induction heating coil to the utensil support and cooking utensil;

FIG. 3 is a fragmentary perspective view of an electric range with an induction cooktop unit as herein taught;

DESCRIPTION OF THE PREFERRED EMBODIMENTS

Figure 4:
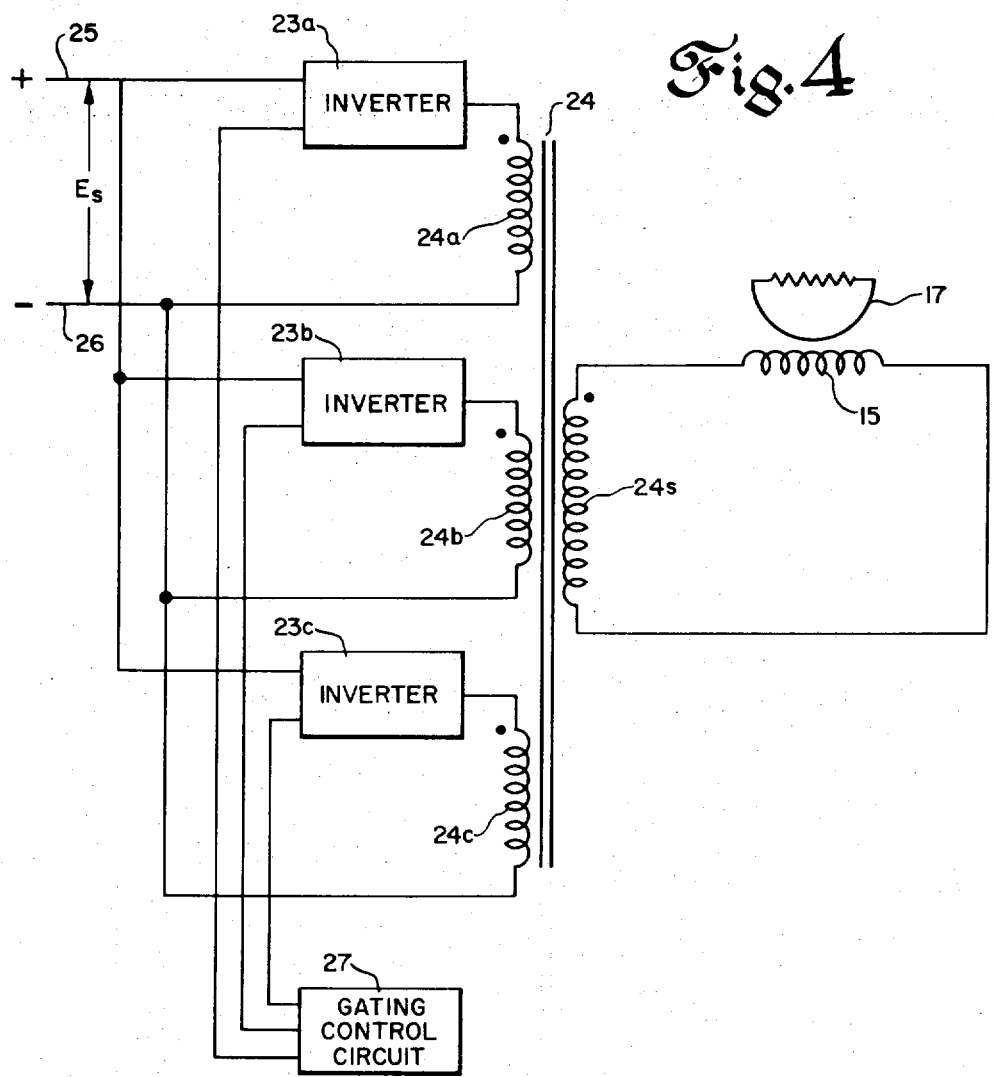
FIG. 4 is a schematic circuit diagram of a multicylinder inverter power circuit with transformer coupling to the induction heating coil.

The induction cooking appliance shown in FIGS. 1–3 will be described with regard to an induction surface heating unit in an electric range, but essentially the same mechanical structure and electronic circuitry in higher and lower power versions is suitable for commercial cooking equipment and for a protable countertop food cooking or warming appliance. The static power conversion circuit indicated generally at 12 is preferably energized by a single phase commercially available 60 Hz, 120 or 240 volt source of alternating current potential, or by a battery source of direct current potential. The static power converter 12 most commonly comprises a rectifier 13 and a solid state inverter 14 for converting the unidirectional rectifier output to an ultrasonic frequency voltage wave that drives the induction heating coil 15. Induction heating coil 15 is a single layer, annular, flat spiral, air-core or ferromagnetic-core coil wound with solid flat strip conductors or braided ribbon conductors. To generate sufficient magnetic flux to heat the utensil to the desired level, coil 15 is tightly wound with the short cross-sectional dimension of the conductors facing upwards and adjacent turns separated by a flat insulating strip 20.

In the cooking appliance (FIG. 2) induction heating coil 15 is appropriately mounted in a horizontal position immediately below a non-metallic or substantially non-metallic support 16 typically made of a thin sheet of glass or plastic. Support plate 16 is commonly referred to as the cooking surface and supports the metallic cooking utensil 17 to be heated. Cooking utensil 17 is an ordinary cooking pot or pan, a frying pan, or some other available metallic utensil used in food preparation, and can be made of magnetic or non-magnetic materials. Special cooking utensils are not required although the best and most efficient results are obtained by optimizing the size, shape, and material of the utensil. Operation of static power converter 12 to impress an ultrasonic frequency voltage wave on induction heating coil 15 results in the generation of an alternating magnetic field. The magnetic flux is coupled across the air gap through non-metallic support 16 to utensil 17. At ultrasonic operating frequencies in the range of about 18–40 kHz the cooking appliance is inaudible to most people.

As shown in FIG. 3, an important feature of induction cooking equipment is the relatively smooth and substantially unbroken utensil supporting surface provided by support plate 16. At ultrasonic frequencies there are insignificant reaction forces which at lower frequencies would cause utensil 17 to move horizontally when placed on the support approximately centered with respect to one of the induction surface unit positions indicated in dashed lines. Similarly, there are no attraction forces of a mechanical nature between the utensil and support plate, thus allowing totally unrestrained movement of the utensil by the user. Control knob 21 for each unit on the upstanding control panel of the range turns the individual unit on and off and sets the desired heating level or specific temperature to which the utensil is to be heated. Among the advantages of induction cooking are, briefly, that the surface of support 16 remains relatively cool; spilled foods do not burn and char, and hence both support 16 and utensil 17 are easy to clean; and the unobstructed utensil support is available for other cooking tasks. The utensil is heated more uniformly than is the case with the conventional gas range or electric resistance heating range, and transfer of energy to utensil 17 is relatively efficient since heat for cooking is generated only in the utensil where it is wanted. Further, since this is a low thermal mass system and there is thus a relatively low storage of heat in the cooking utensil, the heating level or temperature to which the utensil is heated can be changed rapidly, as from boiling to simmering to warming levels.

According to the invention, solid state inverter 14 is a multicylinder inverter power circuit with a plurality of lower power rated inverter units that are operated sequentially to produce individual outputs. The individual outputs are preferably combined by means of a high frequency transformer having a common secondary winding which feeds induction heating coil 15. The multicylinder power circuit shown in FIG. 4 employs three identical solid state inverters 23a, 23b, and 23c that respectively supply ultrasonic frequency power to the individual transformer primary windings 24a, 24b, and 24c. The three unit inverter power circuits are connected in electrical parallel relationship between a pair of common d-c input terminals 25 and 26. These are single-cylinder inverters in the context of the invention, that is, one-device or two-device inverters or simple full bridge type inverters. The d-c supply voltage $E$, provided by rectifier 13 is either a constant or a variable supply voltage depending upon whether rectifier 13 is a full wave diode bridge rectifier or a phase controlled bridge rectifier. Effective control of the power output of the multicylinder power circuit can be obtained by varying the input voltage. The unit inverter modules 23a–23 are preferably controlled by a common gating control circuit 27. On the secondary side of coupling transformer 24, induction heating coil 15 is connected across a common secondary winding 24s. Thus, the combining or integration of the individual power outputs of the unit inverter power circuits is performed by coupling transformer 24. The coupling transformer is operated at ultrasonic frequencies and consequently has a small size. In addition, it preferably has a closed gap construction so that its efficiency is high.

A variety of different types of inverters can be used in constructing the unit inverters 23a–23c in the several single-cylinder unit power circuits. It is preferred, however, to use a series resonant inverter or a series capacitor commutated inverter that generates sinusoidal output pulses. Specific types of series inverters using thyristors as the current switching devices are described in the above-identified applications and also in the book "Principles of Inverter Circuits" by Bedford and Hoft, John Wiley and Sons, Inc., copyright 1964, Library of Congress catalog card No. 64–20078. Another suitable type of inverter is a transistor inverter for generating square or rectangular output power pulses. Suitable gating control circuits 27 that can be used for these different types of inverters are described in the SCR Manual, 4th edition, published by the Semiconductor Products Department, General Electric Company, Electronics Park, Syracuse, New York, copyright 1967. Also see the GE Transistor Manual, 7th edition, copyright 1964, obtainable from the same address. The relation of the output transformer winding to the inverter circuit in each unit power circuit depends upon the particular inverter that is chosen. By way of example, output transformer winding 24a is shown connected in series with inverter 23a, but other connections are possible.

Figure 5:
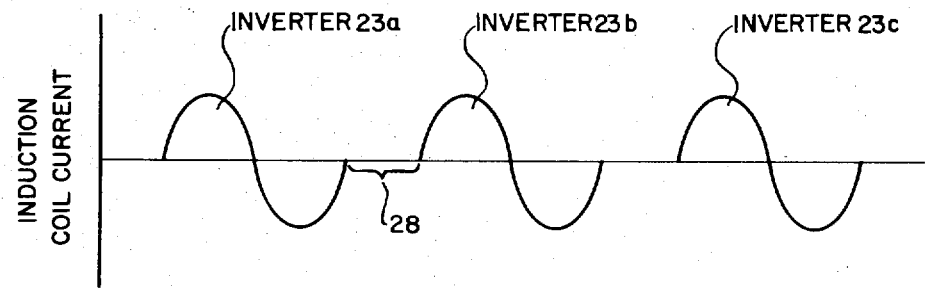
FIG. 5 is a waveform diagram of the composite induction coil current resulting from sequential operation of the three unit inverters in the power circuit of FIG. 4.

The three unit inverter circuits are operated sequentially or in other desired sequence, and as was previously mentioned their individual outputs are combined in coupling transformer secondary winding 24s and applied to induction heating coil 15. The composite induction heating coil current waveform shown in FIG. 5 is obtained by operating unit inverters 23a–23c consecutively in the normal mode. Gating control circuit 27 can be controlled to vary the time delay interval 28 between consecutive sinusoidal output pulses to thereby control the composite output power of the multicylinder power circuit. In this mode of control, the repetition rate of the individual unit inverters is changed to obtain continuous control of the output power. An alternative technique to achieve stepped control of the output power is to operate each unit inverter at the same repetition rate, using only one unit inverter when low output power is desired, and adding the second and third unit inverters as more output power is desired. Each unit inverter circuit produces only a fraction of the total output power and consequently is required to have a corresponding power rating that is a fraction of the maximum output power. Moreover, there are less stringent frequency requirements for the solid state power devices in unit inverters 23a–23, as compared to the high frequency requirements of the solid state power devices in the single-cylinder inverter power circuits described in the cross-referenced applications.

The composite output frequency or repetition rate range of interest is about 18 kHz to 30–40 kHz. The one limit of 18 kHz is generally considered to be the upper limit of human hearing, while the other limit is determined largely by economic considerations and the high frequency limitations of available solid state power devices. The output power range of interest is sufficient to perform different cooking tasks from rapid boiling, on one hand, to the warming of readily burned foods such as rice, on the other hand. A power output range sufficient to perform all of these cooking tasks is 1 to 1.5 kilowatts to less than 100 watts. To obtain wide range control of the output power to change the heating level or utensil temperature, it is usually necessary to use the output frequency deviation technique in addition to some other power control technique such as control of the input voltage. The achievement of power control by varying the composite output frequency or repetition rate is easily obtained by use of the multicylinder inverter power circuit shown in FIG. 4. In addition, the cost of large area, high voltage power semiconductors is sometimes not optimum as compared to a larger number of small area devices of more modest specifications. This is a compound situation for reasons of yield and greater production volume. Thus despite the larger number of power semiconductors and components required for the multicylinder inverter power circuit approach, the lower maximum power and frequency requirements mean that the cost per device or component may be considerably lower. Although a three-cylinder inverter power circuit is illustrated, it is understood that the number of cylinders or unit inverter power circuits is chosen to optimize the cost or performance. The use of identical, modular unit inverter power circuits is preferred, but is not essential to the practice of the invention. A particularly desirable feature of this approach is that the high frequency coupling transformer can be used for impedance matching of source to load.

Figure 6:
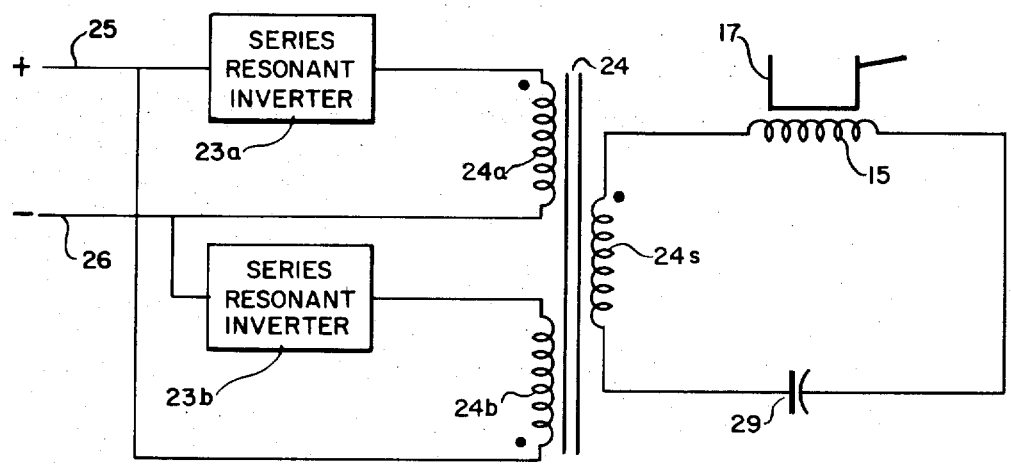
FIG. 6 is a fragmentary circuit diagram of a second embodiment of a transformer-coupled multicylinder inverter power circuit.

The embodiment shown in FIG. 6 illustrates some of the other advantages of the multicylinder inverter power circuit approach. One of these is the use of a common commutating capacitor on the secondary side of coupling transformer 24. A two-cylinder inverter is illustrated comprising the alternately operating series resonant inverters 23a and 23b respectively supplying sinusoidal output pulses to primary transformer windings 24a and 24b. Inverters 23a and 23b are the type using thyristors as the current switching devices that require forced commutation at the end of each half cycle. On the secondary side of high frequency coupling transformer 24, the common commutating capacitor 29 for both inverters 23a and 23b is connected in series with induction heating coil 15 across secondary winding 24s. Common commutating capacitor 29 operates in known manner to commutate off a conducting power semiconductor in either of the inverters 23a or 23b.

Figure 7:
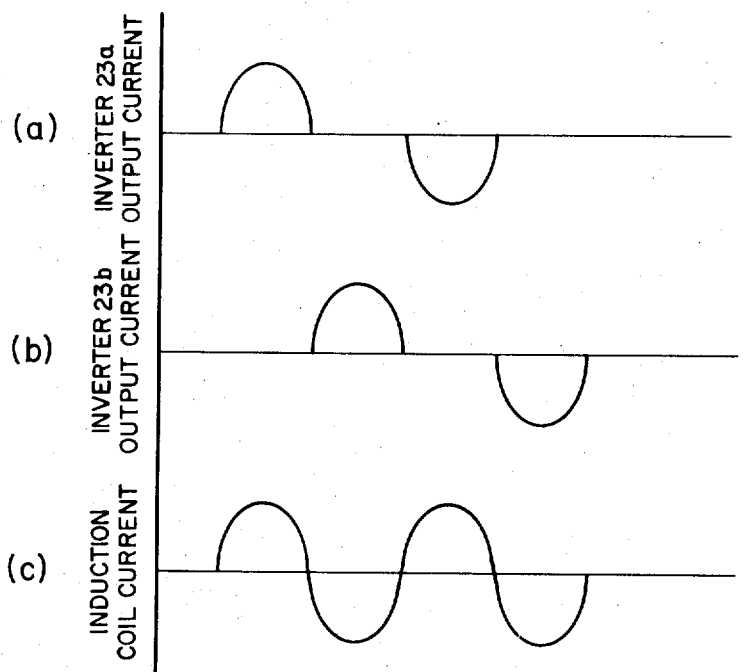
FIG. 7 is a series of current waveform diagrams illustrating the synthesis of a continuous sine wave induction heating coil current using the FIG. 6 power circuit.

Another advantage of the FIG. 6 power circuit is that it can be used to synthesize a continuous sinusoidal output waveform, which may be difficult to obtain with a single-cylinder series inverter. The two primary transformer windings 24a and 24b of the two unit inverter power circuits are connected with opposing polarities, as is indicated by the polarity dots. Referring to FIG. 7, the (a) and (b) diagrams show the respective output currents of inverters 23a and 23b when controlled to produce intermittent half sinusoidal output currents that are essentially out of phase. That is, the two inverters conduct alternately on a half cycle basis without a significant delay between the intervals of conduction. The composite induction coil current shown in the (c) diagram is a continuous sine wave. The higher frequency composite output is possible since the non-conducting intervals of the two unit inverter power circuits are complementary. In addition the output waveform is desirable in that it is sinusoidal without significant discontinuities. The same technique can be used with more than two cylinders to obtain even higher maximum composite power outputs.

In summary, an economical ultrasonic frequency induction cooking appliance incorporates a solid state multicylinder inverter power circuit composed of multiple lower power rated unit inverters whose individual outputs are preferably transformer-coupled to the induction heating coil. The power and frequency requirements of each unit inverter circuit are consequently a fraction of the total required. The multicylinder power converter approach readily facilitates control of the output power over a wide range for achieving the desired cooking temperature, and also the synthesis of a continuous output waveform.

While the invention has been particularly shown and described with reference to several preferred embodiments thereof, it will be understood by those skilled in the art that various changes in form and details may be made therein without departing from the spirit and scope of the invention.

What we claim as new and desire to secure by Letters Patent of the United States is:

1. A solid state cooking appliance for inductively heating a cooking utensil comprising
    an induction heating coil mounted adjacent a substantially unbroken non-metallic utensil support and producing an alternating magnetic field, and
    a static power conversion circuit comprising a multicylinder solid state inverter power circuit for generating an ultrasonic frequency wave that drives said induction heating coil,
    said multicylinder inverter power circuit including a plurality of unit inverter power circuits that are operated selectively to produce individual outputs which are coupled to said induction heating coil.

2. A cooking appliance according to claim 1 wherein said multicylinder inverter power circuit further includes means for combining the individual outputs of the unit inverter power circuits to produce said ultrasonic frequency wave.

3. A cooking appliance according to claim 2 wherein said means for combining the individual outputs of the unit inverter power circuits is a high frequency coupling transformer having a primary winding for each unit inverter power circuit and a common secondary winding connected to said induction heating coil.

4. A cooking appliance according to claim 2 wherein said unit inverter power circuits are operated to vary the repetition rate of the ultrasonic frequency wave and thereby modulate the output power to achieve the desired heating level.

5. A cooking appliance according to claim 2 wherein said unit inverter power circuits are operated at the same repetition rate in different sequences to obtain stepped control of the output power.

6. A cooking appliance according to claim 2 wherein said unit inverter power circuits are substantially identical to one another and operated in a sequence with substantially no time delay between the individual outputs whereby the ultrasonic frequency wave has a substantially continuous waveform.

7. A solid state cooking appliance for inductively heating a cooking utensil comprising
an induction heating coil mounted adjacent a substantially unbroken non-metallic utensil support and producing an alternating magnetic field, and
a static power conversion circuit comprising a multicylinder solid state inverter power circuit for generating a composite ultrasonic frequency wave that drives said induction heating coil,
said multicylinder inverter power circuit including a plurality of unit inverter power circuits that are operated selectively in sequence to produce individual outputs which are combined in a high frequency coupling transformer to form said composite ultrasonic frequency wave.

8. A cooking appliance according to claim 7 wherein said high frequency coupling transformer has a primary winding for each unit inverter power circuit and a common secondary winding connected to said induction heating coil, and
a common commutating capacitor for all of said unit inverter power circuits coupled with said induction heating coil across said secondary winding.

9. A cooking appliance according to claim 7 wherein said unit inverter power circuits are substantially identical to one another and said high frequency coupling transformer has a primary winding for each unit inverter power circuit and a common secondary winding connected to said induction heating coil.

10. A cooling appliance according to claim 9 wherein said unit inverter power circuits are operated consecutively with a variable time delay between the individual outputs to modulate the output power for achieving the desired heating level.

11. A cooking appliance according to claim 9 wherein said unit inverter power circuits comprise series resonant inverters controlled to generate out-of-phase half sinusoidal individual outputs which are combined such that the composite ultrasonic frequency wave has a substantially continuous output waveform.

* * * * *